United States Patent [19]

Furukawa et al.

[11] 4,376,335
[45] Mar. 15, 1983

[54] METHOD OF MOUNTING A TIMING GEAR ON A CRANKSHAFT

[75] Inventors: Hideo Furukawa, Oyama; Masaaki Okamoto, Utsunomiya; Kazuyoshi Shinbori, Tochigi, all of Japan

[73] Assignee: Kabushiki Kaisha Komatsu Seisakusho, Tokyo, Japan

[21] Appl. No.: 310,816

[22] Filed: Oct. 13, 1981

[30] Foreign Application Priority Data

Oct. 20, 1980 [JP] Japan .............................. 55-148437[U]

[51] Int. Cl.³ ............................................. B23P 11/02
[52] U.S. Cl. ........................................ 29/447; 29/464; 33/181 AT
[58] Field of Search ................. 29/447, 464, 468, 467, 29/DIG. 35; 33/181 AT, 180 AT

[56] References Cited

U.S. PATENT DOCUMENTS 3,999,277 12/1976 Hamada ................................. 29/447
4,211,192 6/1980 Baumgartner et al. ............... 29/447

Primary Examiner—Francis S. Husar
Assistant Examiner—Steven E. Nichols
Attorney, Agent, or Firm—Armstrong, Nikaido, Marmelstein & Kubovcik

[57] ABSTRACT

A method of mounting a timing gear on a crankshaft by shrinkage fit. At room temperature, a bore of the timing gear has smaller diameter than that of a mounting portion of the crankshaft. A guide jig having a mounting key portion and a guide key portion is secured to the mounting portion with the mounting key portion being in register with a key way formed therein, which is angularly indexed with respect to a pin portion of the crankshaft. After being heated, the timing gear is mounted on the mounting portion in a predetermined place by sliding it over the mounting portion while engaging a key way of the timing gear with the guide key portion of the guide jig. Then the guide jig is detached from the mounting portion and the timing gear is cooled to effect shrinkage fit thereof on the mounting portion of the crankshaft.

2 Claims, 3 Drawing Figures

METHOD OF MOUNTING A TIMING GEAR ON A CRANKSHAFT

BACKGROUND OF THE INVENTION

This invention relates to a method of fixedly mounting a timing gear on a crankshaft of an internal combustion engine.

In case of mounting a timing gear on a crakshaft, it is substantially necessary to mount the timing gear accurately on the crankshaft at a predetermined angle relationship relative to the crank pin thereof.

The conventional method of fitting the timing gear to the crankshaft comprises forming a keyway on the timing gear mounting portion of a crankshaft for indexing the angle of the timing gear, fitting a key to the keyway, engaging a keyway formed in the timing gear with the key and then sliding the former along the latter whereby rigidly mounting the timing gear on the crankshaft through the key at a predetermined angular relationship therebetween.

In such a structure, however, a torsional stress concentration due to a driving torque tends to occur on the bottom of the keyway of the crankshaft thereby causing a tendency of breakdown of the crankshaft along the keyway. Such a tendency is especially conspicuous in marine engines wherein the engine's output is taken out from the leading end portion of the crankshaft thereof by way of a pulley.

SUMMARY OF THE INVENTION

It is therefore an object of the present invention to provide a method of mounting a timing gear on a crankshaft which overcomes the above noted problems of the prior art.

Another object of the present invention is to provide a method of mounting a timing gear on a crankshaft by using a shrinkage fit.

In accordance with an aspect of the present invention, there is provided a method of mounting a timing gear on a crankshaft having a mounting portion integrally formed therewith, the timing gear having formed therein a bore having a diameter which is made smaller than that of the mounting portion of the crankshaft and a first key way formed in the bore of the timing gear, the first key way being angularly indexed with respect to a tooth of the timing gear, the mounting portion of the crankshaft having formed therein a second key way angularly indexed with respect to a pin portion of the crankshaft, the method comprising: securing a guide jig having a mounting key portion and a guide key portion formed therein to the mounting portion of said crankshaft with the mounting key portion being in register with said second key way; heating said timing gear to expand the diameter of the bore so that the same becomes larger than that of the mounting portion of said crankshaft; mounting said timing gear on the mounting portion of said crankshaft by engaging the first key way of said timing gear with the guide key portion of said guide jig; detaching said guide jig from the mounting portion of said crankshaft while keeping said timing gear mounted in place; and cooling said timing gear to shrink the diameter of the bore so that the same tends to become smaller than that of the mounting portion of said crankshaft thereby firmly mounting said timing gear on the mounting portion of said crankshaft.

The above and other objects, features and advantages of the present invention will be readily apparent from the following description taken in conjunction with the accompanying drawings.

DESCRIPTION OF THE PREFERRED EMBODIMENT

Figure 1:
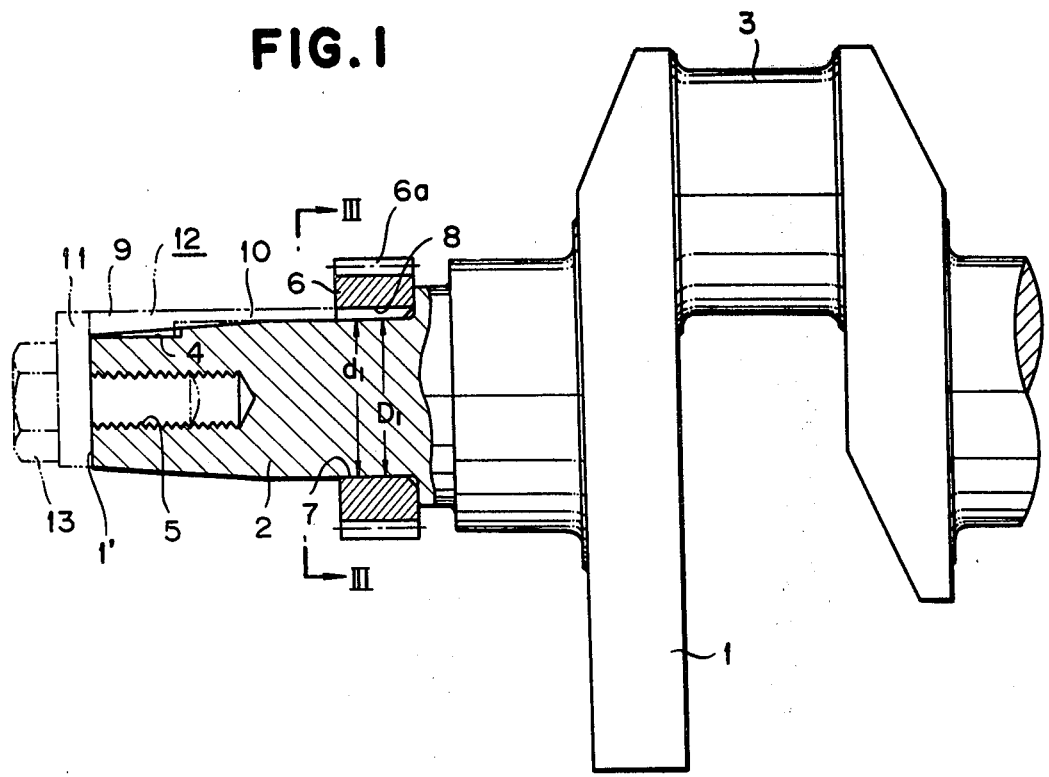
FIG. 1 is an elevational view of a leading end portion of a crankshaft partly in cross-section with a timing gear being mounted thereon.
Figure 2:
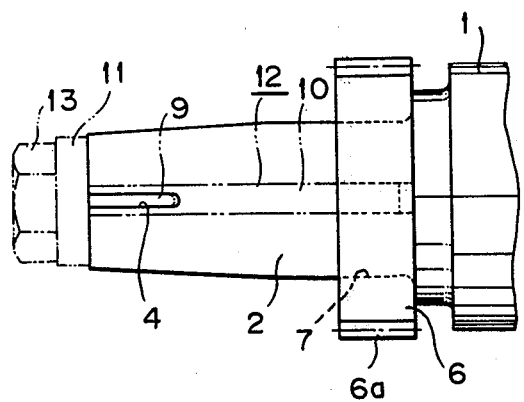
FIG. 2 is a top plan view of FIG. 1 with parts being cut-away.
Figure 3:
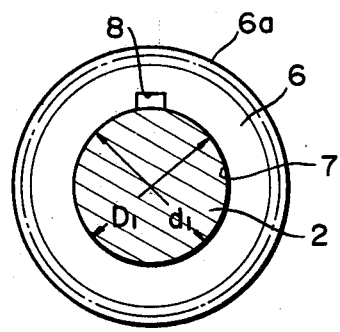
FIG. 3 is a cross-sectional view taken along the line III—III of FIG. 1.

The present invention will now be described below by way of example only with reference to the accompanying drawings.

A crankshaft 1 of an internal combustion engine includes a timing gear mounting portion 2 and a crank pin 3. Formed in the leading end of the timing gear mounting portion 2 are a guide keyway 4 having an accurately indexed angular relation with respect to the crank pin 3, and also a screw-threaded hole 5 opeining in the leading end face 1' thereof.

Reference numeral 6 denotes a timing gear which has a bore 7, the diameter $d_1$ of which is somewhat smaller than the diameter $D_1$ of the timing gear mounting portion 2 of the crankshaft so that the timing gear 6 can be fixedly secured by shrinkage fit to the mounting portion 2. Further, the bore 7 has a keyway 8 formed therein which is accurately indexed in position with respect to a tooth 6a of the timing gear 6.

Thus, when mounting the timing gear 6 onto the crankshaft 1, a guide jig 12 having an attachment key portion 9 adapted to fit in the guide keyway 4, a guide key portion 10 adapted to fit in the keyway 8 and an abutment portion 11 is fitted to the crankshaft 1 by securing the abutment portion 11 to the end face 1' of the crankshaft by means of a bolt 13 so that the attachment key portion 9 may be fitted in the guide keyway 4 and the guide key portion 10 may extend to the timing gear mounting portion 2.

Subsequently, the timing gear 6 is heated to allow its bore 7 to have an increased diameter and is then fitted over to the timing gear mounting portion 2 of the crankshaft 1 by engaging the keyway 8 with the guide key portion 10 of the guide jig 12 and sliding the former along the latter.

Therafter, the bolt 13 is loosened to remove the guide jig 12 and the timing gear 6 is cooled down to secure it fixedly onto the timing gear mounting portion 2.

As mentioned hereinabove, the timing gear 6 can be fixedly mounted on the timing gear mounting portion 2 of the crankshaft 1 at a predetermined angular relationship therebetween without having to form a specific timing gear mounting keyway in the timing gear mounting portion 2, and therefore it is possible to eliminate the stress concentration on the crankshaft due to the formation of the keyway and prevent the occurrence of breakdown accidents of the crankshaft.

Although the guide keyway 4 is formed on the end portion of the timing gear mounting portion 2, this keyway 4 serves only to locate the guide jig 12 and may be formed to have a narrow width and a sharrow depth. Therefore, no substantial stress concentration takes place in the portion in which the keyway 4 is formed so that there is no possibility of occurrence of breakdown of the crankshaft.

As mentioned herein-above, according to the present invention, the timing gear 6 can be accurately fixedly mounted on the crankshaft 1 at a predetermined angular relationship therebetween without having to use any key.

Accordingly, it becomes possible to prevent the occurrence of breakdown of crankshafts due to the stress concentration thereon.

What is claimed is:

1. A method of mounting a timing gear on a crankshaft having a mounting portion integrally formed therewith, the timing gear having formed therein a bore having a diameter which is made smaller than that of the mounting portion of the crankshaft and a first key way formed in the bore of the timing gear, the first key way being angularly indexed with respect to a tooth of the timing gear, the mounting portion of the crankshaft having formed therein a second key way angularly indexed with respect to a pin portion of the crankshaft, the method comprising:

securing a guide jig having a mounting key portion and a guide key portion formed therein to the mounting portion of said crankshaft with the mounting key portion being in register with said second key way;

heating said timing gear to expand the diameter of the bore so that the same becomes larger than that of the mounting portion of said crankshaft;

mounting said timing gear on the mounting portion of said crankshaft by engaging the first key way of said timing gear with the guide key portion of said guide jig;

detaching said guide jig from the mounting portion of said crankshaft while keeping said timing gear mounted in place; and cooling said timing gear to shrink the diameter of the bore so that the same tends to become smaller than that of the mounting portion of said crankshaft thereby firmly mounting said timing gear on the mounting portion of said crankshaft.

2. A method according to claim 1 wherein said second key way is shallow and extending from a leading end of the mounting portion of said crankshaft.

* * * * *